Dec. 3, 1963  SEIICHI ANDO  3,112,722
SOLDERING GUN
Filed Dec. 11, 1961  2 Sheets-Sheet 1
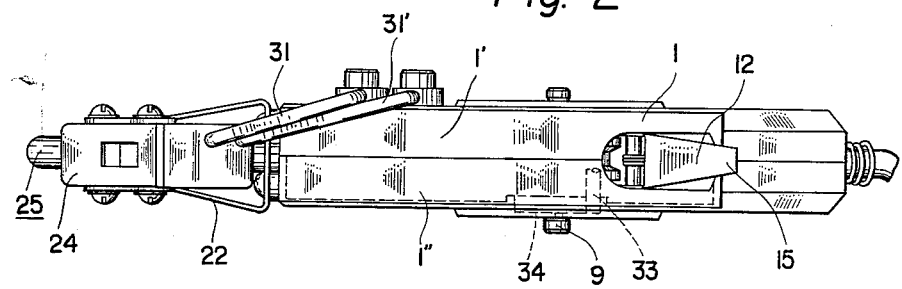
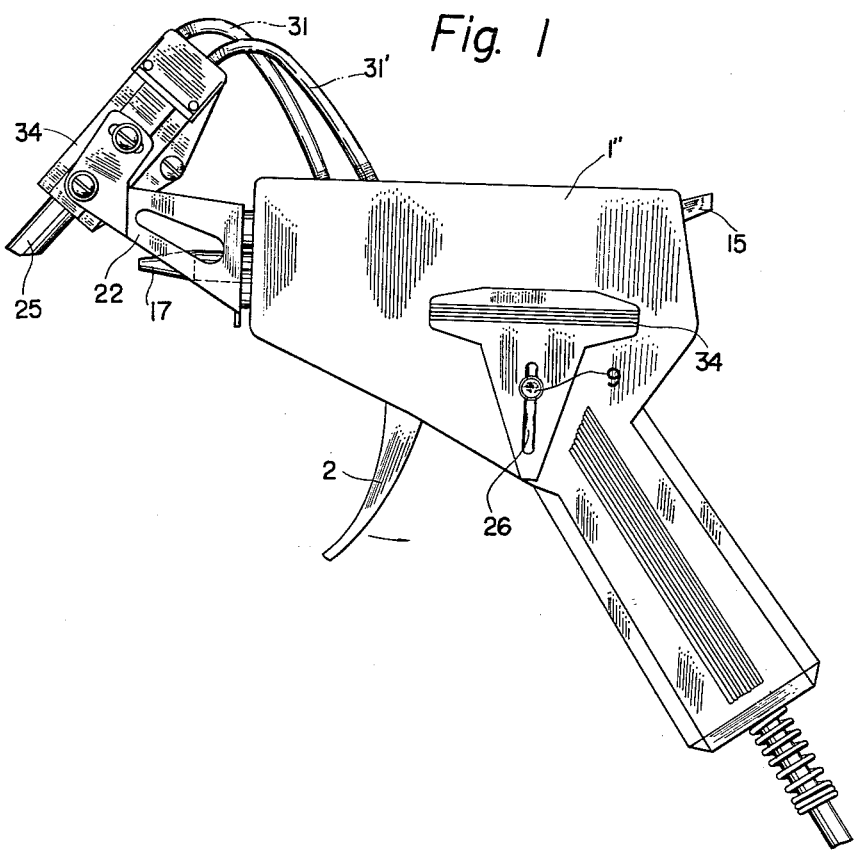
INVENTOR.
Seiichi Ando
BY
Pierce, Scheffler & Parker
att'ys

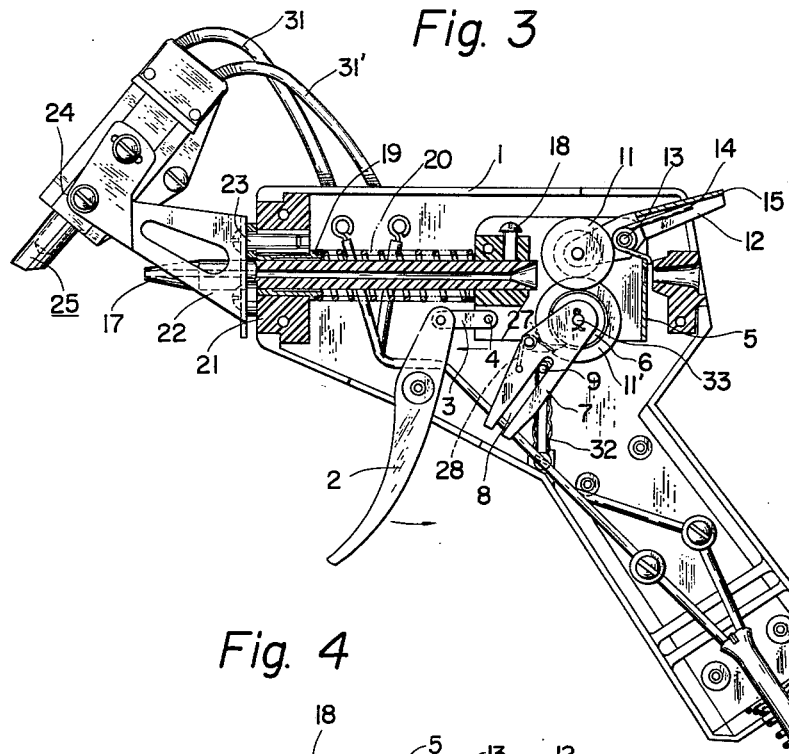
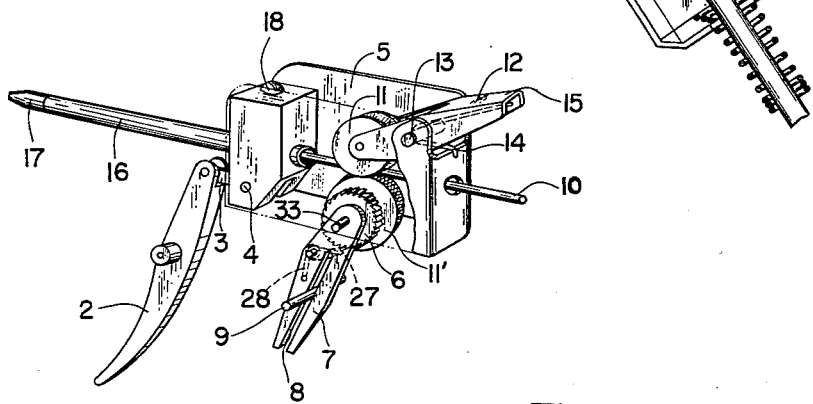
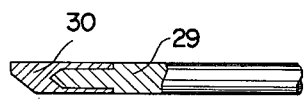
Fig. 3
Fig. 4
Fig. 5

United States Patent Office 3,112,722
Patented Dec. 3, 1963

3,112,722
SOLDERING GUN
Seiichi Ando, Tokyo, Japan, assignor to Riken Plastic Engineering Co., Ltd., Tokyo, Japan, a corporation of Japan
Filed Dec. 11, 1961, Ser. No. 158,217
1 Claim. (Cl. 113—94)

This invention relates to improvements of a soldering gun.

Soldering is an operation extensively carried out in the manufacture of electric machines and communicating apparatuses. The result of soldering has a great influence on the performance and life of such electric machine or communicating apparatus. If it is carried out effectively, the efficiency of the production will be greatly increased.

Soldering has been usually carried out with both hands by holding a solder in the left hand and holding a soldering iron in the right hand. Therefore, it is difficult to carry out a precise soldering operation and to increase the efficiency of the manufacture. The present invention is suggested to eliminate such defects.

A principal object of the present invention is to provide a soldering gun whereby soldering can be made with one hand.

Another object of the present invention is to provide a soldering gun wherein a fixed amount of solder can be always fed to a soldering tip by pulling a trigger.

Another object of the present invention is to provide an electric soldering gun wherein the amount of a wire solder being fed out can be optionally adjusted by moving the position of a pin and the wire solder can be fed at this adjusted constant amount.

FIGURE 1 is an elevation of a soldering gun according to the present invention.

FIGURE 2 is a plan view of the same.

FIGURE 3 shows the mechanism within the soldering gun by removing a part of the case.

FIGURE 4 is a perspective view of a solder feeding mechanism in the soldering gun of the present invention.

FIGURE 5 is a sectioned view of a soldering tip.

An embodiment of the present invention shall now be explained with reference to the accompanying drawings.

In the drawings, 1 is a case for a pistol-shaped soldering gun and is made, for example, of a plastic material. Said case is made by integrally combining right and left split moldings 1' and 1", respectively. 2 is a trigger rotatably pivoted within a window made in the underside of the case. 3 is a connecting plate pivoted to one end of the trigger 2. 4 is a pin for connecting said connecting plate 3 with a box-shaped operating case 5 containing rollers 11 and 11', a ratchet 6 and a lever 7 for feeding a solder. Said ratchet 6 is pivoted within the operating case 5. Said lever 7 is pivoted to the shaft 33 of the ratchet 6. The roller 11' is to be used to feed a wire solder 10. The ratchet 6 and roller 11' are integrally fixed by means of the shaft 33. Said shaft 33 is inserted so as to be slidable at both ends within runners 34 formed by horizontally projecting a part of the case moldings 1' and 1". 27 is a pawl engaging at the forward end with the teeth of the ratchet 6 and secured at the other end to the side of the lever 7. The pawl 27 is resiliently pressed on the side by a spring 28 so as to act to prevent the reversal of the ratchet 6. 8 is a slot made in said lever 7. 9 is a pin inserted in said slot 8. Said pin 9 is inserted in windows 26 made in the case 1 and has nuts screwed at the ends so as not to be pulled out of the windows 26. Sine-curved springs 32 are arranged on both sides of the windows 26 and are secured at both upper and lower ends to the case 1 by means of screws so as to form wide and narrow parts of the clearance between the springs 32 so that the pin 9 may be fixed in any desired one of the wide parts.

The roller 11 is pivoted to a lever 12 pivoted to the upper part of the operating case 5. 13 is a shaft for pivoting the lever 12 to the operating case. 14 is a spring engaging at one end with the operating case 5 and at the other end with the inside of the lever 12 so as to resiliently press the lever 12 so that the rollers 11 and 11' may be in contact with each other. When the lever 12 is pushed at the upper end 15, the roller 11 will be elevated so that the force holding the wire solder 10 may be released, the wire solder 10 may slide freely forward and rearward and the position of the forward end of the wire solder may be adjusted. 16 is a pipe secured at one end to the side of the operating case 5 by means of a screw 18. 17 is a nozzle tapered toward the forward end and screwed at the rear end to the pipe 16. Said nozzle is so formed as to be replaceable in response to the diameter of the wire solder. 19 is a guide for the nozzle to slide and is secured to a spacer 21 made of material being comparatively heat-proof and held by the case moldings 1' and 1". 20 is a spring inserted between the guide 19 and the operating case 5 so as to resiliently press the operating case 5 so that, even if the case 5 moves forward, it may return to the original position. 22 is a U-shaped supporting arm secured to the spacer 21 by means of a screw 23. 24 is a holder to securely hold a soldering tip 25. Said holder 24 is pivoted to the forward end of the supporting arm 22 so that the inclination of the soldering tip 25 may be varied as desired.

Said soldering tip 25 is formed by closely fitting a cap 30 made of nickel or a nickel alloy to a bar 29 of copper or a copper alloy. 31 and 31' are lead wires.

The operation of the present invention shall now be explained. When the trigger 2 is pulled, the connecting plate 3 will move in the direction indicated by the arrow and at the same time the operating case 5 combining the rollers 11 and 11', ratchet 6 and lever 7 will also advance in the direction indicated by the arrow. In such case, the shaft 33 will slide within the runners 34 made on the case moldings 1' and 1" and the pipe 16 will slide within the guide 19 so as to help the advance of the operating case 5. The ratchet 6 will be pushed by the pawl 27 attached to the lever 7 and the roller 11' made integral with said ratchet 6 will also rotate. Therefore, the wire solder 10 held by the rollers 11 and 11' will advance with the rotation of the roller 11' so as to be fed by a fixed amount from the forward end of the nozzle 17 fixed to the operating case. When the trigger is released, the operating case and the nozzle will retreat due to the force of the spring 20, the ratchet within the operating case will make the pawl 27 slide and therefore the wire solder will not retreat from the nozzle. That is to say, if the amount of advance of the operating case 5 is $a$ and the amount of the wire solder 10 pushed out by the rotation of the roller 11' within the operating case is $b$, when the trigger 2 is pulled, the operating case 5 will advance, at the same time the wire solder 10 will be pushed out and therefore the forward end of the wire solder will advance by $a+b$ from the initial position. When the trigger 2 is released, the operating case 5 will be retracted by the amount $a$ by the spring 20 and therefore, after all, the wire solder 10 will remain advanced by the amount $b$. The feed of the wire solder can be adjusted by moving the position of the pin 9 upward or downward within the windows 26. For example, if the pin 9 is moved to and fixed at the upper ends of the windows 26, the angle of rotation of the roller will become larger. Therefore, as the operating case 5 moves in the direction indicated by the arrow, the amount of rotation of the roller 11' will become larger and thus the feed of the wire solder will be able to be increased.

Copper is conventionally mostly used for the material of the soldering tip 25. However, copper is so likely to make an alloy with tin as to be corroded with the solder.

It is therefore difficult to continuously use the tip of copper. However, in the present invention, the soldering tip 25 is made by closely fitting the cap 30 made of nickel or a nickel alloy high in anticorrosiveness to the tip of the bar 29 of copper or a copper alloy high in thermal conductivity. Therefore, the soldering tip as a whole is so high in thermal conductivity and anticorrosiveness as to be endurable to continuous use.

At the nozzle 17 is screwed to the pipe 16, it can be easily replaced. Thus the nozzle best adapted to the diameter of the wire solder can be used.

Further, the position of the soldering tip 25 can be varied as desired by adjusting the inserting position for the soldering tip 25 in the holder 24 and the angle of inclination of the holder. When the soldering gun of the present invention is to be used, if the soldering tip 25 is heated in advance and then the trigger 2 is pulled, the wire solder 10 will advance into contact with the soldering tip 25 and will be fused onto the tip.

According to the present invention, as the soldering operating can be made by holding the case 1 in one hand as described above, the efficiency of the operation can be increased. The present invention is adapted to a precise soldering operation. As the feed of the solder can be made constant, the soldered amount can be made always constant. The feed of the solder can be also adjusted as desired. Further, as the position and angle of the soldering tip can be varied as desired, it is very easy to adjust and handle the soldering gun of the present invention.

What I claim is:

A soldering gun comprising a pistol shaped hollow outer casing, a soldering tip adjustably supported on the front end of said outer casing, an operating case slidably mounted in said outer casing for movement toward and away from said front end of said outer casing, a pipe secured to the front end of said operating case and extending through an opening in the front end of said outer casing, two parallel shafts carried by said operating case, cooperating rollers mounted on said parallel shafts and positioned to grippingly engage a rod of solder and guide it through said pipe, a ratchet mounted on the shaft of one of said rollers and secured to said one roller, a lever rotatably mounted on the last named shaft, a rotatable pawl carried by said lever and engaging said ratchet, a spring secured to said lever and engaging said pawl to yieldingly urge the same against said ratchet, a slot in said lever, an elongated window in said outer casing adjacent to said slot in said lever, a pin adjustably mounted in said window and extending through said slot in said lever, a trigger pivotally mounted on said outer casing with its inner end pivotally secured to said operating case and its outer end protruding from said outer casing for moving said operating case and the parts carried thereby including said pipe and said rollers forwardly with respect to said outer casing and a second spring mounted between said outer casing and said operating case and tensioned to move said operating case rearwardly with respect to said outer casing, whereby reaward movement of the protruding end of said trigger moves said operating case forwardly in said outer case and rotates said rollers to feed a rod of solder toward said soldering tip and forward movement of said protruding end of said trigger is accompanied by reaward movement of said operating case by said second spring.

References Cited in the file of this patent

UNITED STATES PATENTS

| | | |
|---|---|---|
| 1,667,618 | Abbott | Apr. 24, 1928 |
| 1,893,093 | Linville et al. | Jan. 3, 1933 |
| 2,195,944 | Stream | Apr. 2, 1940 |
| 2,875,719 | Smith | Mar. 3, 1959 |

FOREIGN PATENTS

| | | |
|---|---|---|
| 125,090 | Germany | Sept. 25, 1900 |
| 463,141 | Great Britain | Mar. 23, 1937 |
| 696,873 | Great Britain | Mar. 10, 1952 |